United States Patent [19]
Clarke, Jr.

[11] 3,818,261
[45] June 18, 1974

[54] STEPPING MOTOR SPEED CONTROL APPARATUS

[75] Inventor: Charles J. Clarke, Jr., Hopkington, Mass.

[73] Assignee: Honeywell Information Systems, Inc., Waltham, Mass.

[22] Filed: Dec. 23, 1971

[21] Appl. No.: 211,520

[52] U.S. Cl............ 318/696, 318/415, 318/685
[51] Int. Cl. ................................. G05b 19/40
[58] Field of Search ....... 318/696, 685, 439, 138, 318/415

[56] References Cited
UNITED STATES PATENTS

| | | | |
|---|---|---|---|
| 3,146,386 | 8/1964 | Gerber | 318/68 S |
| 3,411,058 | 11/1968 | Madsen et al. | 318/415 X |
| 3,466,517 | 9/1969 | Leenhouts | 318/696 |
| 3,523,230 | 8/1970 | York | 318/685 X |
| 3,553,549 | 5/1971 | Leenhouts | 318/696 X |
| 3,579,279 | 5/1971 | Inaba | 318/696 |
| 3,588,662 | 6/1971 | Buebel | 318/696 |
| 3,611,102 | 10/1971 | Leenhouts | 318/696 |
| 3,621,357 | 11/1971 | Kubo | 318/696 |

Primary Examiner—G. R. Simmons
Attorney, Agent, or Firm—John S. Solakian; Ronald T. Reiling

[57] ABSTRACT

Acceleration of a stepping motor is provided by means of a stream of pulses whose frequency is increased with time and by means for generating a control signal in response to a predetermined number of pulses, each of the control signals directing that the motor be stepped in accordance with a predetermined pattern. Deceleration control is provided by providing the stream of pulses with a frequency which is decreased with time.

17 Claims, 3 Drawing Figures

3,818,261

STEPPING MOTOR SPEED CONTROL APPARATUS

BACKGROUND OF THE INVENTION

The present invention relates generally to motor speed control systems and more particularly to stepping motor speed control apparatus used for control of acceleration and decelaration of one or more motors.

There are various types of stepping motors each of which is rotated in response to an input pulse train supplied to the motor. The motor rotates by an angle correspondingly proportional to the number of control pulses in the input pulse train and the speed of the motor is proportional to the frequency of the input pulse train. In a numerical control system such as used in machine tool control, it is exceedingly important that the motor motion follow exactly the control pulses so that the motor will not respond erroneously. This is especially significant during acceleration and deceleration of the motor.

One system of the prior art is shown in U.S. Pat. No. 3,579,279 wherein a pulse control circuit, connected between a pulse supply and a motor, gradually increases the frequency of control pulses in the beginning of the pulse train and gradually decreases the frequency of pulses in the end of the pulse train so that proper starting and stopping of the motor is enabled. This system of the prior art, although suited for point to point motion control as controlled by the motor, does not allow an associated processor to control the exact path taken by the controlled device to reach the desired end point.

It is accordingly an object of the present invention to provide an improved stepping motor speed control system.

It is another object of the invention to provide stepping motor control apparatus which provides improved acceleration and deceleration control.

It is a further object of the invention to provide speed control apparatus for one or more motors which apparatus allows optimal control of the exact path taken by a device as controlled by the motor or motors.

SUMMARY OF THE INVENTION

The purposes and objects of the present invention are satisfied by providing means for integrating a first signal as provided by for example a data processor, the first signal having first and second states for directing acceleration and deceleration respectively of a motor. Coupled to the integrating means is an oscillator means for generating a stream of pulses which is dependent upon the magnitude of the integrated first signal. Means for generating a control signal after a predetermined number of pulses is coupled with means for directing movement of a motor. The motor is rotated in response to the means for directing and thus a device coupled to the motor is moved a predetermined amount each time a control signal is generated.

BRIEF DESCRIPTION OF THE DRAWINGS

The advantages of the foregoing description of the present invention will become more apparent upon reading the accompanying detailed description in connection with the figures in which.

DETAILED DESCRIPTION OF THE PREFERRED EMBODIMENTS

Figure 1:
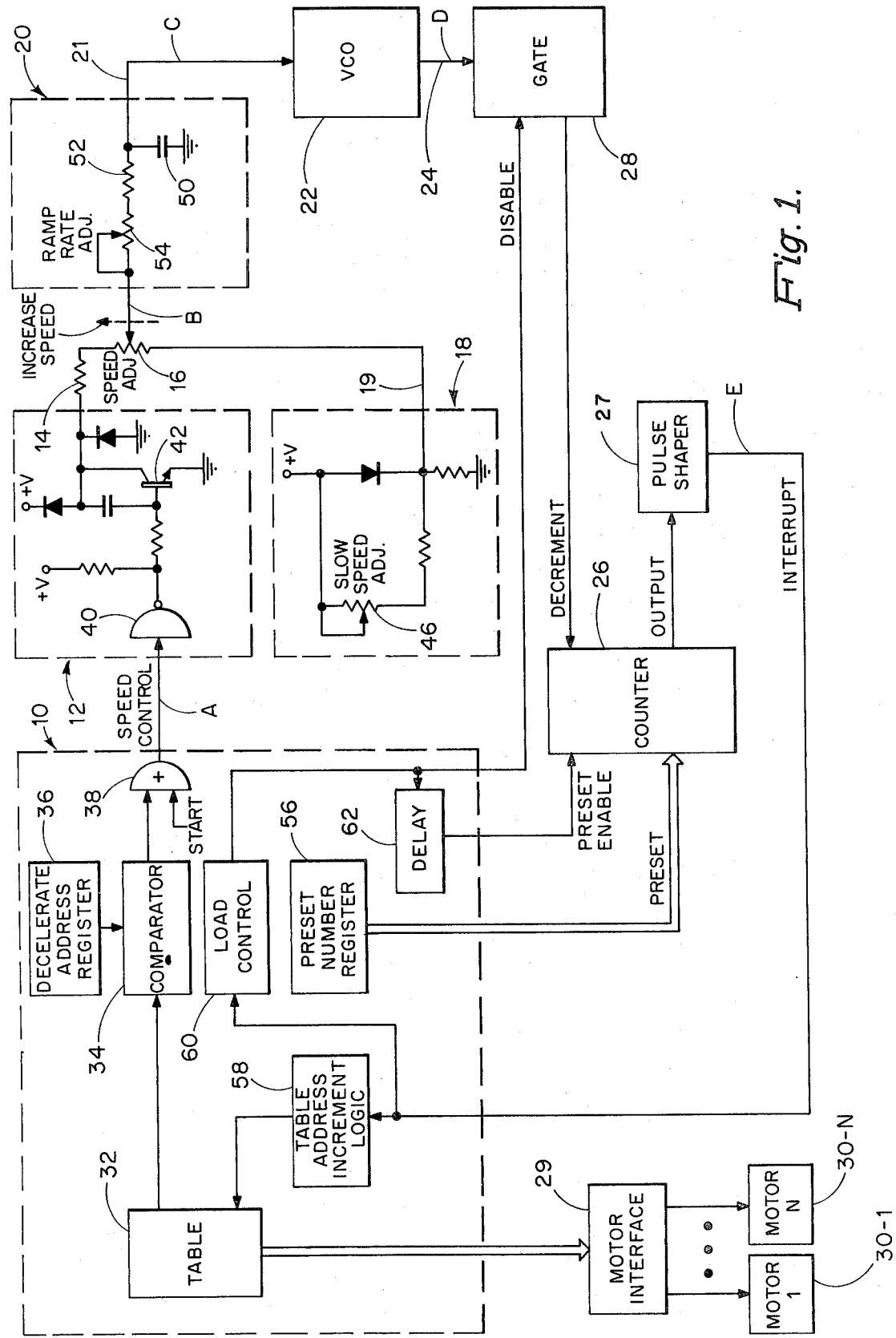
FIG. 1 illustrates a schematic block diagram of a preferred embodiment of the invention.

FIG. 1 illustrates a processor 10 coupled to provide a speed control signal to switch 12. The output of switch 12 is coupled to a speed adjust circuit comprised of resistors 14 and 16 as well as circuit 18. The variable resistance contact of resistor 16 is coupled to integrator 20 to provide a ramp voltage on line 21 which either increases or decreases with time depending upon the state of the speed control signal provided by processor 10. The integrated signal is coupled with a voltage controlled oscillator 22 to provide a stream of pulses on line 24. The frequency of the pulses is provided to increase with time as the signal level on line 21 decreases with time (acceleration mode), and is provided to decrease with time as the signal level on line 21 increases with time (deceleration mode).

The pulses on line 24 are coupled to the decrement input of counter 26 via gate 28. Counter 26 is a preset counter which is coupled to be preset to a predetermined number by processor 10. When counter 26 is being preset, gate 28 is disabled from supplying pulses to counter 26. Counter 26 is preset by a number which is dependent upon the specified maximum or steady state motor speed desired, the motor specified rotation for each step of increment thereof, and the maximum frequency of oscillator 22. Counter 26 is further coupled to provide a signal to pulse shaper 27 when the preset number has been completely decremented by the stream of pulses from oscillator 22. The pulse from pulse shaper 27 provides an interrupt signal to processor 10. Thus, it can be seen that the time to completely decrement counter 26 is greater when the pulses on line 24 are lower in frequency than when they are higher in frequency. Accordingly, it will be more specifically seen that the time between interrupt signals decreases with time when accelerating the motors and increases with time when decelerating the motors.

The interrupt signals from counter 26 via pulse shaper 27 cause the processor 10 to provide another preset number to counter 26, which preset number remains the same if the specified maximum or steady state motor speed is to remain the same. Each time an interrupt signal is received by processor 10, processor 10 directs via motor interface 29 any one of motors 30-1 to 30-N or each of motors 30-1 to 30-N to step as specified by a table 32 stored in processor 10. Table 32 includes information which indicates which motor, for a multimotor system, is to be stepped as a function of time, i.e., in response to each interrupt, and the total steps to be taken by each motor. For example, if there are two motors in the system, in response to the first interrupt, the first motor may be stepped once and the second motor may not be stepped; in response to the second interrupt, both motors may be stepped once; in response to the third interrupt only the second motor might be stepped once; in response to the fourth interrupt, the first motor might be stepped twice and the second motor might be stepped once, etc. The sequence of stepping as a function of time in response to the interrupts is determined by the curve which the device controlled by the motor is to trace. Further, the motors in a multiple motor system may be rotated at different speeds by utilizing the preset number for a first motor speed and then calculating in the processor from the interrupts generated for the first motor the number of pulses before an interrupt is generated for any additional motor. The addressing to the table 32 would then be made independently for each motor.

Initially as the motors are started to rotate, they are accelerated as determined by the frequency of pulses on line 24 and the preset number in counter 26. When the pulses on line 24 reach a constant frequency, the motors reach a specified maximum or steady state speed. At a certain point in time slightly before the curve to be traced by the controlled device reaches its final point, the motor must be decelerated. At this time, the speed control signal as directed by processor 10 changes state. Detection of the condition that deceleration of the motor or motors must be initiated, may be provided by processor 10 by means of comparator 34 which is coupled to receive at one input the address i.e. the step number, at which deceleration must be started. This decelerate address is stored in register 36 indicating that address in table 32 which when addressed indicates that the motors must start to decelerate. The comparator 34 is thus coupled to receive at its other input an indication that the address of table 32 at which the motors must decelerate, has in fact been addressed. When the two inputs compare, comparator 34 generates a high level signal or binary one state via OR gate 38 to command deceleration of the motors. The other input to gate 38 is the START signal which provides a low level signal or binary zero state to switch 12.

Thus, it will be seen that the speed control apparatus of the invention may control one or more motors in order to move a device from an initial point to a final point, that the starting and stopping of the motors is controlled for error free operation, and that the system provides optimal control of the intermediate movement of the device between the initial and final points of a curve to be traced.

Figure 2:
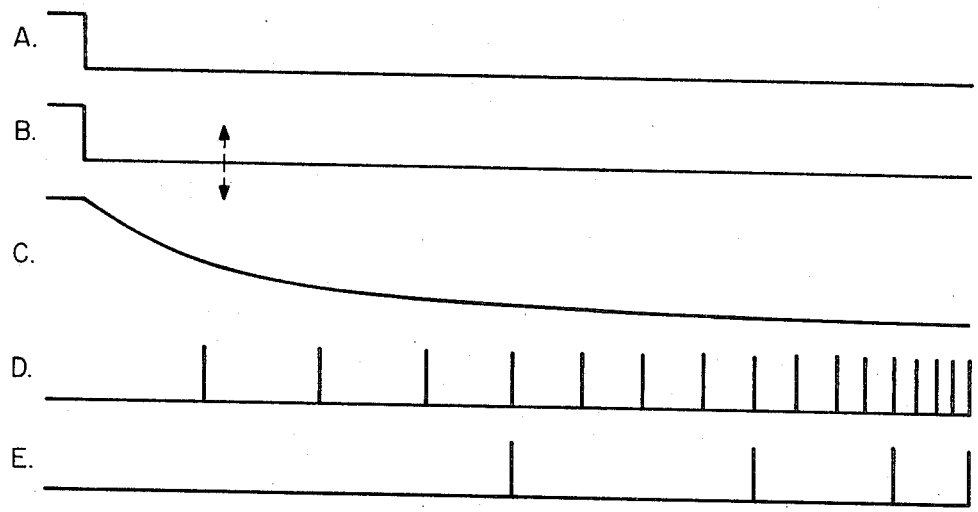
FIG. 2 includes timing diagrams further illustrating the acceleration mode of the present invention when viewed with the diagram of FIG. 1; and, FIG. 3 includes timing diagrams further illustrating the deceleration mode of the present invention when viewed with the diagram of FIG. 1.
Figure 3:
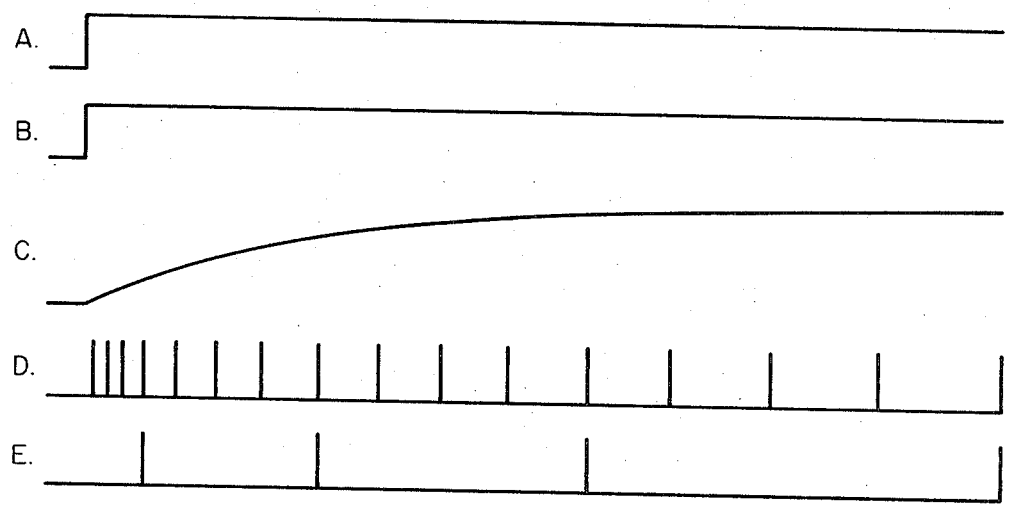

The operation will be more particularly described when viewed with the timing diagrams of FIGS. 2 and 3. First, however, the manner in which the counter 26 is preset, i.e., the number preset into counter 26 will be explained by way of example. Assume that the device to be moved by the motors is to be moved at a speed of 6 inches per minute or 0.1 inches per second in one axis, i.e., motion of one motor. Also, assume that the motor and associated mechanical linkage to the device to be moved requires 1,000 steps of the motor to move the device 1 inch. Further assume that the maximum frequency of oscillator 22 is 40,000 pulses per second. The preset number which must be provided to counter 26 for the speed specified is found by multiplying 0.1 inches per second times 1,000 steps per inch to give 100 steps per second and then dividing 40,000 pulses per step by 100 steps per second to give 400 pulses per step. The number 400 is therefrore the preset number and thus after every 400 pulses provided to the decrement input of counter 26, an interrupt signal is generated thereby directing that the motor be stepped in accordance with the addressed location of table 32.

Now explaining the operation of circuits 12 and 18 together with resistors 14 and 16, switch 12 includes an inverting element 40 whose output is effectively coupled to the base electrode of transistor 42. Transistor 42 includes biasing resistors and voltage regulating diodes and a feedback capacitor coupled between a supply voltage (+V) and circuit ground in a conventional manner which need not be further explained so that a low level signal or binary zero state at the input of driver 40 provides a high level signal or binary one state at the output of driver 40, thereby turning transistor 42 on and providing a low output impedance so that approximately zero volts appears at the collector electrode thereof. With a supply voltage (+V) of approximately plus +6 volts, circuit 18 includes a diode and resistance arrangement which provides approximately 5.3 volts on line 19. Variable resistance 46 provides a slow speed adjustment so that the voltage on line 19 may range between approximately 5.2 and 5.4 volts. The collector electrode of transistor 42 and line 19 are coupled to opposite ends of the circuit arrangement of resistor 14 and variable resistance 16. In one embodiment the values of resistor 14 and the total resistance of resistor 16 are equal so that with approximately 5.3 volts on line 19 and zero volts at the output of switch 12, approximately 2.65 volts results at the junction of resistors 14 and 16. Thus 2.65 volts appears across resistor 16 which resistor 16 may be utilized to increase the speed of the motor or motors when the variable contact is moved in the direction indicated by the dotted arrow, more particularly as the voltage input to integrator circuit 20 decreases.

We have seen that the speed of the motor may be adjusted by resistor 16 when a low level or binary zero state is received at the input of element 40, more particularly when the apparatus is in the acceleration mode. When the apparatus is in the deceleration mode, a binary one state or high level signal is recieved by driver 40 so that resistor 16 cannot be utilized to change the speed of the motor or motors. This is desirable since it is usually required and often absolutely necessary that when the motors start to decelerate they be allowed to decelerate in accordance with the contents of table 32 as controlled by oscillator 22 and counter 26. More particularly, with a high level signal at the input of element 40, transistor 42 will be turned off thereby providing a high impedance output so that a high level signal of approximately 5.3 volts appears at the collector electrode of transistor 42, that is, at the output of switch 12. This again assumes that the voltage +V is plus 6 volts. With 5.3 volts at both ends of the circuit arrangement of resistors 14 and 16, a change in voltage cannot be provided by the connection of the variable contact of resistor 16 to the input of circuit 20. Thus circuit 20 receives a constant 5.3 volts input during the deceleration mode regardless of the adjustment of resistor 16.

Now further discussing the operation of the apparatus of the invention, reference should be made to FIGS. 1 and 2. When the system is started a START signal is received by gate 38 thereby providing a low level signal to inverting element 40. The speed control signal provides an input to element 40 as shown by waveform A in FIG. 2. The combination of circuits 12 and 18 and resistors 14 and 16 provides a variable magnitude signal as shown by waveform B at the variable contact of resistor 16. Waveform B is provided to the input of integrator circuit 20 which provides integrating components shown as capacitor 50, resistor 52 and variable resistor 54. Variable resistor 54 is utilized to adjust the ramp rate of waveform C. The output of integrator circuit 20 is shown as waveform C in FIG. 2. Waveform C is provided to the input of voltage controlled oscillator 22 to produce the stream of pulses shown in FIG. 2 as waveform D. It will be seen that the frequency of pulses of waveform D increases with time as the input to oscillator 22, that is waveform C, decreases in magnitude with time. Pulses of waveform D are provided to gate 28 which passes the pulses of waveform D to counter 26 except when disabled by logic circuitry which may be contained in processor 10, which circuitry will be discussed hereinafter.

Counter 26 having been preset by a number contained in preset number register 56, is decremented by the pulses of waveform D. From the example hereinbefore, the preset number was 400, that is 400 pulses of waveform D must be produced in order to generate an interrupt signal shown as waveform E in FIG. 2. For ease of illustration, the pulses shown for waveform D are the last pulse of every one hundred pulses. Thus the four pulses shown for waveform D actually represent 400 pulses. After 400 pulses of waveform D a signal is generated and shaped by pulse shaper 27 to produce an interrupt signal shown as waveform E. The interrupt signal is utilized to address the contents of table 32 by means of the table address increment logic 58 which may be, for example, that address counter and associated logic shown in U.S. Pat. No. 3,161,763. Logic 58 is utilized to increment the address of table 32 so that successive commands to the motor or motors may be provided as a function of time. The interrupt signal also disables gate 28 by means of load control logic 60 which may include logic to provide proper timing during the preset operation of the apparatus of the invention which logic 60 may be, for example, found in the program control logic shown in U.S. Pat. No. 3,523,230. After gate 28 has been disabled, counter 26 is enabled for presetting by means of a signal from load control logic 60 as delayed by element 62. Assuming by the same example that the preset number in register 56 remains the same, that is the number 400, counter 26 is again preset to the number 400 so that after an additional 400 pulses from oscillator 22 another interrupt signal is generated as shown by the second pulse of waveform E. The process is recycled until the motors reach a specified maximum speed at which time, the time between interrupts is a constant value or the process is recycled until the system requires that deceleration of the motor or motors be started.

It should be noted that minimal time is required between the time an interrupt signal is generated and the time that the counter 26 is again started to decrement. This time is usually constant in nature, however should this time become a factor in the operation of the system, means not shown may be devised to keep track of the number of pulses generated on line 24 during the interim period between the time an interrupt signal is generated and the time that counter 26 is allowed to decrement, so that the number of pulses so occurring may be subtracted from the number to be preset into counter 26. That is, if four pulses from line 24 have occurred during this interim period, then the number 400 in preset number register 56 would be reduced so that the number 396 would be preset into counter 26.

When deceleration of the motor or motors must be started as indicated for example by the addresses of table 32 or by other interrupt means such as system failure or manual shut down, the signal from comparator 34 becomes high as shown by waveform A in FIG. 3. The output of circuits 12 and 18 and resistors 14 and 16 as shown by waveform B is also high and is not adjustable by resistor 16. Waveform B is provided to the input of integrator circuit 20 which provides waveform C which is shown to increase magnitude with time. Oscillator 22 in response to waveform C provides a stream of pulses on line 24 as indicated by waveform D. Again waveform D shows four pulses before an interrupt signal is generated as indicated by waveform E. Each of these pulses of waveform D is a last occurring pulse of 100 pulses on line 24 in accordance with the previous example. Thus the interrupt signals as shown by waveform E are generated after 400 pulses of waveform D so that the time between interrupts increases with time as the motor or motors decelerate. Once the motors have stopped, the curve is complete, that is the device controlled by the motors has moved from an initial point to a final point. It has thus been seen that while so moving, not only has the acceleration and deceleration pattern been controlled, but also the curve between the initial and final point of the curve traced has been optimally controlled by means of the arrangement shown which includes table 32.

Having described the invention, what is claimed as new and novel and secured by letters Patent is:

1. Apparatus for controlling movement of a stepping motor, said apparatus comprising:
   A. means for producing a stream of signals having a frequency which changes as a function of time, said means for producing comprising
      1. means for providing a speed control signal,
      2. means coupled to said means for providing for integrating said speed control signal to produce an integrated speed control signal, and
      3. oscillator means responsive to said integrated speed control signal for producing said stream of signals;
   B. means for generating a control signal after a predetermined number of said signals; and
   C. means responsive to said control signal for providing a signal for stepping said motor.

2. Apparatus as defined in claim 1 wherein said frequency is increased with time in order to accelerate said motor and wherein said frequency is decreased with time in order to decelerate said motor.

3. Apparatus as defined in claim 1 further comprising speed control adjust means coupled in the coupling between said means for providing said speed control signal and said means for integrating so that the frequency of said stream of signals may be changed.

4. Apparatus as defined in claim 3 further comprising circuit means coupled with said speed control adjust means for disabling change of said frequency when said motor is decelerating.

5. Apparatus as defined in claim 1 further comprising:
   A. means for increasing said frequency to accelerate said motor;
   B. wherein said frequency is held substantially constant in order to rotate said motor at a substantially constant speed; and C. means for decreasing said frequency to decelerate said motor.

6. Apparatus as defined in claim 5 further comprising means for detecting that said motor should be decelerated and wherein said means for decreasing is responsive to said means for detecting.

7. Apparatus for controlling movement of a stepping motor, said apparatus comprising:
- A. means for producing a stream of signals having a frequency which changes as a function of time;
- B. means for generating a control signal after a predetermined number of said signals, said means for generating comprising
  1. counter means,
  2. means for presetting a number into said counter means, said number corresponding to a function of the desired steady-state speed of said motor, and
  3. means coupling said stream of signals to decrement the preset number in said counter means, so that said control signal is generated when said preset number is completely decremented; and
- C. means responsive to said control signal for providing a signal for stepping said motor.

8. Apparatus as defined in claim 7 wherein said motor is rotated at least one step each time said control signal is generated.

9. Apparatus for controlling movement of a stepping motor, said apparatus comprising:
- A. means for producing a stream of signals having a frequency which changes as a function of time;
- B. means for generating a control signal after a predetermined number of said signals, said means for generating comprising
  1. counter means,
  2. means for storing a number in said counter means, said number corresponding to a function of the desired steady-state speed of said motor, and
  3. means coupling said stream of signals to change the value of the number stored in said counter means by a predetermined amount until said value reaches a predetermined number, said control signal generated when said predetermined number is reached; and
- C. means responsive to said control signal for providing a signal for stepping said motor.

10. Apparatus for controlling movement of a stepping motor, said apparatus comprising:
- A. means for producing a stream of signals having a frequency which changes as a function of time;
- B. means for generating a control signal after a predetermined number of said signals; and
- C. means responsive to said control signal for providing a signal for stepping said motor, said means for providing comprising
  1. storage means for indicating the stepping pattern of said motor as a function of time, and
  2. means for stepping said motor in accorandance with the indication of said storage means.

11. Apparatus as defined in claim 10 wherein said apparatus controls the movement of a plurality of stepping motors and wherein said storage means indicates the stepping pattern of each of said motors as a function of time.

12. Apparatus as defined in claim 10 wherein said means for directing further comprises means for addressing successive indications of said storage means in response to successive ones of said control signals.

13. Apparatus for controlling the speed of a stepping motor, said apparatus comprising:
- A. means for receiving a first signal;
- B. means for integrating said first signal;
- C. oscillator means responsive to said means for integrating for generating a stream of pulses having a frequency which is dependent upon the magnitude of said integrated first signal;
- D. means for generating a control signal after a predetermined number of said pulses; and
- E. means for moving said motor by a predetermined amount each time said control signal is generated.

14. Apparatus as defined in claim 13 wherein said frequency is increased with time in order to accelerate said motor and wherein said frequency is decreased with time in order to decelerate said motor.

15. Apparatus as defined in claim 13 wherein said means for generating comprises:
- A. counter means;
- B. means for loading a number into said counter means; and wherein
- C. said control signal is generated each time said predetermined number of said pulses generated is equal to said number loaded into said counter means.

16. Apparatus as defined in claim 15 wherein said number loaded into said counter means is a function of a predetermined speed of said motor and further comprising means for reloading said number into said counter means in response to the generation of said control signal.

17. Apparatus for controlling movement of a stepping motor, said apparatus comprising:
- A. means for receiving a first signal;
- B. means for integrating said first signal;
- C. means, responsive to said means for integrating, for providing a stream of second signals having a frequency which changes as a function of time;
- D. means for generating control signals after each of successive predetermined numbers of said second signals; and
- E. means responsive to said control signals for providing third signals for stepping said motor.

* * * * *